United States Patent [19]

Dressler, Jr.

[11] 4,190,734
[45] Feb. 26, 1980

[54] CABLE PEDESTAL RODENT GUARD SYSTEM, METHOD OF CONSTRUCTING SAME, AND KIT AND COMPOSITION

[75] Inventor: John A. Dressler, Jr., Bloomfield, Iowa

[73] Assignee: Dee-Jay Independent Services Group, Inc., Bloomfield, Iowa

[21] Appl. No.: 830,439

[22] Filed: Sep. 6, 1977

[51] Int. Cl.² .................... H02G 9/02; A01N 17/00
[52] U.S. Cl. ......................................... 174/38; 52/101;
 52/309.4; 52/517; 206/219; 424/17; 424/30;
 428/907
[58] Field of Search .................... 174/37, 38, 98, 136;
 43/124, 131; 52/101, 309.4, 517, 742, 743;
 405/157; 424/17, 30, DIG. 10; 428/907;
 206/219

[56] References Cited

U.S. PATENT DOCUMENTS

| | | | |
|---|---|---|---|
| 3,257,496 | 6/1966 | Hamilton | 174/38 |
| 3,380,258 | 4/1968 | Young | 174/98 X |
| 3,503,800 | 3/1971 | Eddy | 405/157 X |
| 3,816,610 | 6/1974 | Lusby | 424/17 |
| 3,841,032 | 10/1974 | Grannis | 174/38 X |

Primary Examiner—Laramie E. Askin
Attorney, Agent, or Firm—Zarley, McKee, Thomte, Voorhees & Sease

[57] ABSTRACT

A pedestal enclosure for above ground extensions of underground cables in combination with a rigid, foamed, cell-developed, insulating, polymeric, thermosetting, plastic material in which a substantial number of the cells contain encapsulated therein a gaseous state effective rodent retardant.

11 Claims, 3 Drawing Figures

CABLE PEDESTAL RODENT GUARD SYSTEM, METHOD OF CONSTRUCTING SAME, AND KIT AND COMPOSITION

BACKGROUND OF THE INVENTION

This invention relates to outdoor, above ground electrical closures known as pedestals, and more particularly to a pedestal which is designed to prevent the bothersome problem of insect and rodent access to the interior chamber defined by the pedestal.

It is well known that it is necessary that underground cables have above ground extensions in order to provide access to the underground cable for repair, maintenance and the like. Requirements for a satisfactory pedestal are that it be serviceable from an electrical maintenance standpoint so that splices and connections to the cable may be made efficiently and reliably; the pedestal must be of a mechanical design such that access to the interior chamber defined by the pedestal is facilitated; the pedestal must be of a construction such that it will withstand possible rough treatment in its installation; and, of course, the pedestal must provide for easy installation and convenient cable access.

Because the cables which are fed into the interior chamber of the pedestal stand are of varying sizes, most pedestals now sold do not have a pedestal bottom cover. The reason for this is simply that there is no standard access opening size for the cables to be fed into the interior pedestal chamber. Thus, for example if the access opening were quite large and the cable small, the opening would be very large allowing easy access by insects, rodents and the like. On the other hand, if the cable is very large and the access opening small, the bottom of the pedestal stand would have to be reamed out in order to increase the opening size to permit access. It is for this reason that pedestal stands do not have a bottom cover and the pedestal chamber is simply extended down into the ground, with the ground providing the bottom.

One particularly bothersome problem with pedestal stands is that the interior chamber of the pedestal stand provides a warmer desirable place for insects and rodents. Thus, rats, mice and other small burrowing rodents often will chew the insulating material away from the cable wires and dig a hole around the wires and burrow up into the pedestal chamber where they nest. This of course presents an undesirable environment for maintenance people who open the pedestal stands.

Accordingly, it is an object of this invention to provide a pedestal stand which retards insect and rodent access thereto.

Another object of this invention is to provide such a pedestal stand, and a system therefor, which can be used with pedestals presently sold on the marketplace without modification.

Another object of this invention is to provide a method of retarding rodent and insect access to the interior chamber of a pedestal stand.

A still further object of this invention is to provide a rigid, foamed, cell-developed, polymeric material for use at the bottom of a pedestal stand chamber, with the cells containing in a gaseous state an insect and rodent retardant which is releasable upon rupture of the cells.

A still further object of this invention is to provide a method of encapsulating a normally liquid rodent retardant in the rigid cells of a foamed thermosetting, insulative material.

Yet another object of this invention is to provide a kit of all liquid ingredients for forming a rigid, foamed, cell-developed, polymeric, plastic material containing encapsulated gaseous rodent retardant in the cells of the plastic material, the kit being small and usable directly at the pedestal site by pouring reaction ingredients together and pouring the mixed reaction ingredients into the bottom of a pedestal chamber.

The method and means of accomplishing these and other objects will become apparent from the detailed description of the invention which follows below.

SUMMARY OF THE INVENTION

The invention relates to the combination of a pedestal and at the bottom of the pedestal in a chamber, a foamed, cell-developed rigid, thermosetting, insulative, plastic material, a substantial number of the cells containing a gaseous rodent retardant which is released upon cell rupture. The invention also relates to a method of retarding rodent access to the interior cable holding chamber of a pedestal, to a method of encapsulating in a gaseous state a normally liquid rodent retardant in a rigid, cell-developed, thermosetting material, to the composition of the rigid, foamed, cell-developed, polymeric material having encapsulated therein gaseous rodent retardant, and to a kit for use at a pedestal site for forming the desired foamed thermosetting plastic material in the bottom of a pedestal chamber.

DETAILED DESCRIPTION OF THE INVENTION

Figure 1:
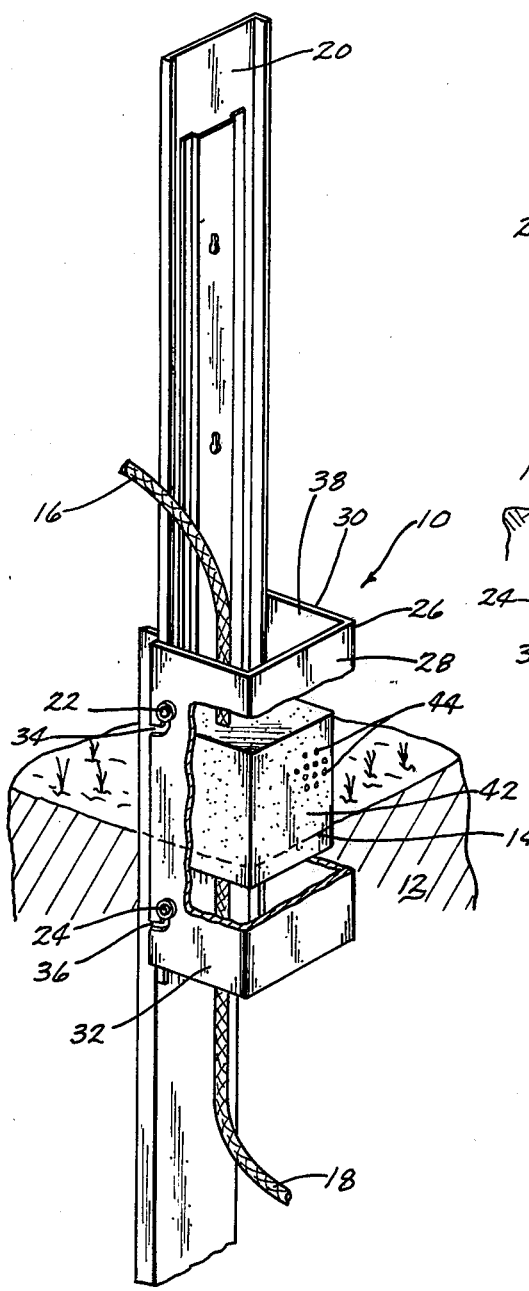
FIG. 1 is a perspective view, with parts broken away, of a pedestal stand containing the foamed, insulative, thermosetting material in the bottom of the pedestal cavity.
Figure 2:
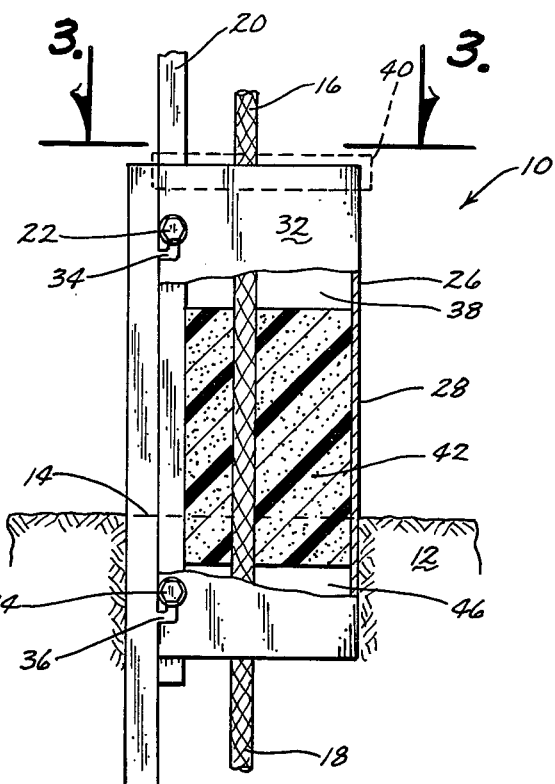
FIG. 2 is an elevated side view of the pedestal of FIG. 1.
Figure 3:
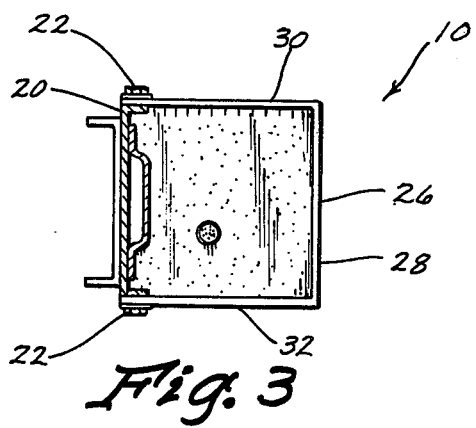
FIG. 3 is a plan view of the pedestal with the top cover removed looking down into the pedestal cavity.

Referring now to FIG. 1, there is illustrated a pedestal 10 of conventional construction supported in the ground 12 with the earth line depicted at arrow 14, for housing an above ground extension 16 of underground cable 18.

The pedestal 10 includes a pedestal mounting stand 20 which is imbedded into the earth 12 to provide a perpendicular mounting stake.

Mounted to the sides of pedestal stand 20 are cover mounting screws 22 and 24. As depicted, it can be seen that one pedestal mounting screw 22 is above the earth line and the other 24 below the earth line. Corresponding mounting screws appear on the opposite side of pedestal stand 20 and are not depicted herein.

Pedestal housing 26, as depicted, is of U-shaped construction having a front surface 28, and opposing sides 30 and 32. Sides 30 and 32 have L-shaped slots 34 and 36 for sliding receipt of mounting screws 22 and 24 in order to support housing 26 on pedestal stand 20. Thus, as can be seen, pedestal stand 20 forms the back closure of pedestal housing 26.

As mentioned previously, pedestal housing 26 does not have a bottom and cable 18 extends from its undergound position upwardly through the bottom opening of pedestal housing 20 into the interiorally defined chamber 38. Top cover 40 is slidably received on the top portion of housing 26 to provide a top closure for the pedestal housing 26.

In the normal means of operation, pedestal 10 is mounted as described and ground 12 below the earth line 14 provides the bottom closure for pedestal housing 26. However, this is unsatisfactory in that small rodents, insects or the like chew the above ground extension 16 of cable 18, burrow up through the ground and find a convenient and desirable nesting place inside of pedestal housing 26 in chamber 38.

In accordance with this invention, this undesired entry into chamber 38 by rodents and insects is prevented by filling the bottom portion of chamber 38 with a rigid foamed material which contains encapsulated within the cells of the foam, a gaseous repellant, or retardant, the two terms being used interchangeably herein, which upon cell rupture, releases rodent retardant into the environment thereby driving away would-be intruders.

As can be seen, a substantial portion, and especially all of the lower portion of chamber 38 is completely filled with foamed polymeric material 42. The material 42 is an insulative polymeric thermosetting plastic material which is rigid and has a definite cellular structure 44. Encapsulated in cells 44 in a gaseous state is an insect and rodent retardant.

The insulative, rigid, foamed, polymeric material 42 is prepared in situ within the chamber 38 of the pedestal at the actual in use site of the pedestal. The pedestal is set up in the conventional fashion previously described herein and the top cover 40 left open.

All thermosetting plastic polymeric materials such as 42 are a polymer of at least two liquid ingredients, for simplicity referred to herein as component A and component B. Liquid components A and B are mixed together in a single container the contents shaken vigorously for several seconds, at which point the polymerizing reaction begins; the reaction becomes exothermic and starts to "cream." At this point the material is poured into the pedestal cavity, which preferably has a covering sheet 46 positioned on top of the ground at the bottom of the chamber 38. One of the polymer forming ingredients, let's say for example, component A, contains a normally liquid rodent retardant which is capable of volatilization to a gaseous state upon the exothermic thermosetting reaction of the liquid ingredients A and B when combined. The heat of reaction in the formation of the foam causes the rodent retardant to volatilize and as the foam becomes tacky and ultimately rigid, the rodent retardant is encapsulated into the cells 44 of the foamed polymeric material 42. Thereafter, rodents that eat away the insulation of cable 18 and burrow into the interior chamber 38 of pedestal housing 26 are, upon biting into the foam material 42, repulsed by the rodent retardant which is released upon rupture of cells 44. As a result, the rodents and insects find interior chamber 38 a non-desirable nesting place.

It should be noted that it is essential that foamed polymeric material 42 contain within cells 44 a gaseous state rodent retardant. In the absence of such a retardant, it has been found that the foamed polymeric material 42 does not inhibit rodents but in fact may attract them. Thus, the rodents burrow through the ground into the foam material 42, and while they are not attracted by the rigid foamed material 42, they simply chew it away to provide a snug insulated and warm interior cavity for nesting. Thus, a foam alone without its combination with gaseous cell encapsulated rodent retardant, will not prove effective for use in applicant's invention.

As heretofore mentioned, foamed, insulative, polymeric, thermosetting plastics which are rigid and have an interior cell structure are in all cases formed by mixing at least two normally liquid organic chemical ingredients. Typically, one of the ingredients provides the basic polymer units, and the other, often a cross linking agent together with a polymerization catalyst and a foaming agent such as a conventional blowing agent which generates gaseous material to cause foaming.

Rigid type plastic foams, such as polyurethane foams and polystyrene foams are known and are useful herein. Typical blowing agents which are incorporated into the organic liquid ingredients include halocarbons such as monoflurotrichloromethane. Other materials which can be used to provide rigid foams include polyvinyl chloride foams, often called expanded PVC.

As heretofore mentioned, the precise foaming material 42 used is not critical. However, it must be the result of mixing at least two liquid chemical ingredients, it must form a rigid foam material having a cell-developed structure, it must be thermosetting, it must be exothermic in the reaction forming the foam material 42, and it must be insulative. The reaction ingredients must be exothermic in order that they provide the necessary heating reaction to volatilize the rodent retardant from its normally liquid state to a gaseous state so that it will be encapsulated within the cells 44 of the foam polymeric material 42.

Preferred foams meeting all of these requirements are polyurethane foams, which are made thermosetting by the condensation reaction of a polyisocyanate and a hydroxyl containing material such as a polyol. Typically in their formation, a polyether such as polypropylene glycol is treated with a di-isocyanate in the presence of some water, and a catalyst (amines, tin soaps, organic tin compounds or the like). As the polymer forms, the water reacts with the isocyanate groups to cause cross-linking and also produces carbon dioxide which causes foaming. In other cases, trifluoromethane or similar volatile materials are incorporated in small amounts as a blowing agent.

In the most preferred polyurethane system, the first liquid ingredient, component A, is a polymethylene, polyphenyl isocyanate (about 98% to 99% with from about 1% to about 2% of propoxylated glycerine present as a copolymer). This liquid is the isocyanate component.

The other liquid component, B, is propoxylated, aromatic amino polyols, 53% to 54% and 15% to 16% of O,O-diethyl-N-N-bis [2 hydroxy ethyl]-amino phenylphosphonates, from about 7% to about 8% propoxylated glycerine, from about 0.7% to about 0.8% of a silicone oil, and from about 22% to about 23% of trichlorofluoromethane blowing agent.

Component A is sold by Upjohn under the designation "Isocyanate Systems CPR 402" and the registered trademark PAPI. Component B is sold by the same supplier, Upjohn, using the trade name designation "CPR 402, Rigid Urethane Foam."

An additive to the first component is a normally liquid rodent retardant which upon the heat of reaction of formation of the polyurethane foam will volatilize to provide gaseous retardant encapsulated within the cells 44 of the rigid foam 42. The most preferred rodent retardant is O,O-dimethyl O-2, 4, 5-trichlorophenyl phosphorothioate, which is added to the isocyanate component, component A. The amount added to the isocyanate component will vary, but typically about a quart and a half, estimated to be about 2 pounds, can be added to a 55 gallon, 500 pound drum of component A. Of course, this is just a convenient level and other levels can be added. The amount of component A to be mixed with Component B is also variable, but a 1:1 ratio has been found satisfactory.

O,O-dimethyl O-2, 4, 5-trichlorophenyl phosphorothioate is the preferred rodent retardant since it is soluble in the isocyanate component A, and will vaporize into a gaseous state at the normal heat of reaction when component A and component B are mixed together.

It has been found convenient for use in this invention to have the isocyanate component, Component A, in an inert container, and to have the basic polyol material, component B, in a second inert container. Of course, as previously mentioned, the retardant is dissolved in the isocyanate component.

Both of these containers are then sealed into a flexible shipping bag container such as a polyethylene or polypropylene plastic container. The kit is then sold to the consumer user.

At the pedestal site, the kit is opened, one bottle of active ingredient is poured into the second bottle of active ingredient, after which the remaining filled bottle is capped, shaken vigorously for from 5 to 10 seconds, and then as the products start to cream and as the reaction becomes exothermic as evidenced by warming in the holder's hand, the mixed liquid ingredients are poured into the bottom of the pedestal cavity 38. The foam will rise in approximately 2½ minutes and be tack free after about 2 to 3 additional minutes, with total rigidity occurring in about one hour. The retardant is vaporized by the heat of reaction and encapsulated in the cells 44 of the rigid foam 42.

In one preferred embodiment, the kit is used by first tearing open the plastic bag and placing the plastic bag at the bottom of the pedestal chamber 38, adjacent to the ground and surrounding as well extension cable 16. This prevents seepage of the liquid foaming ingredients into the ground before formation of the foam occurs.

Thus, as can be seen, applicant's invention allows the continued use of conventional pedestals, but yet will provide a convenient and economically satisfactory means of rodent repellant. It therefore accomplishes at least all of the stated objects of the invention.

EXAMPLE

A kit containing two inert bottles of polymer forming components A and B is prepared. Component bottle A contains 1.5 ounces of polymethalene, polyphenyl isocyanate (about 98% to about 98.9% by weight) and from about 1% to about 2% of propoxylated glycerine present as a co-polymer. This liquid isocyanate component is sold by Upjohn Company under the trademark CPR 402. It contains mixed therewith between 3% and 4% by weight of O,O-dimethyl O-2,4,5-trichlorophenyl phosphorothioate which is a liquid animal retardant and insect retardant.

The second component bottle in the kit, component B, contains propoxylated aromatic amino polyols, (53% to 54%, 15% to 16% of O,O-diethyl-N-n-bis-[2 hydroxy ethyl]amino phenylphosphonates, from about 7% to about 8% propoxylated glycerine, from about 0.7% to about 0.8% of a silicone oil, and from about 22% to about 23% of trichlorofluromethane blowing agent.

This component B is also sold by the same supplier Upjohn, using a tradename designation CPR 402, rigid urethane foam. Both component bottles are contained in a polyethylene tearable, flexible package.

The bag is cut open, spread around the base of the cables 18 in a pedestal 10, the contents of component bottle A are poured into component bottle B, and component bottle B is then capped and shaken vigorously for from 5 to 10 seconds. It is noted that in about 28 seconds the mixture begins to cream and the bottle feels warm to the touch. At this point the mixture is poured into the bottom of chamber 38 of pedestal 10. The foam rises in about 2 minutes and 35 seconds; becomes tacky after about another two minutes, and total rigidity is reached within one hour. The temperature obtained by the exothermic reaction was about 120° F.

After the foaming occurred, the product was examined and it was found that gaseous rodent retardant was encapsulated within the formed cells of the foam 42. Moreover, it was noted that the foam adhered to the pedestal and the cable alike with no damage to either. The product itself was also found to be insulative.

Numerous tests with actual in-use pedestals employing the invention as described herein, showed that rodents were repulsed and that they failed to nest in pedestals employing the invention.

What is claimed is:

1. In combination, a pedestal enclosure for enclosing above ground extensions of underground cables, which defines a cable holding chamber having an open bottom adapted for extension into the ground for access to underground cables, and in said holding chamber, and blocking the bottom thereof a rigid, foamed, cell-developed, insulating, polymeric, thermosetting, plastic material, in which a substantial number of said cells contain encapsulated therein an effective gaseous rodent retardant.

2. The combination of claim 1 wherein said rigid, foamed, cell-developed, polymeric, thermosetting, plastic material is a polyurethane foam system.

3. A method of retarding rodent access to the interior cable holding chamber of a cable pedestal having an open bottom, said method comprising:

installing a cable pedestal having an open bottom;

mixing at least two normally liquid organic chemical ingredients capable upon exothermic reaction of providing a rigid, thermosetting, foamed, cell-developed, polymer, at least one of said ingredients containing therein a normally liquid rodent retardant capable of volatilization to a gaseous state upon the exothermic, thermosetting reaction of said other ingredients, and pouring said mixed ingredients into said holding chamber of said pedestal at a location so as to block access to the interior thereof through said open bottom.

4. The method of claim 3 wherein an additional step includes placing a covering layer of flexible sheet material at the bottom of said chamber before said mixed ingredients are poured into said chamber.

5. The method of claim 3 wherein said mixed ingredients are not poured into said pedestal chamber until the mixture begins to cream and the reaction becomes exothermic.

6. A rigid, foamed, cell-developed, thermally set, polymeric material, and encapsulated in a substantial number of the cells thereof, a gaseous state rodent retardant for release to the environment upon rupture of said cells.

7. The composition of claim 6 wherein said formed polymeric material is a polyurethane foam.

8. The composition of claim 7 wherein said rodent retardant is O,O-dimethyl O-2,4,5-trichlorophenyl phosphorothioate.

9. A kit for forming a rigid, foamed, cell-developed, polymeric, plastic material in which a substantial number of the cells encapsulate an effective volatilized rodent retardant for release upon rupture of said cells, comprising:

a first container with liquid isocyanate, a second container with a poly ether, at least one of said containers having a blowing agent therein, and at least one of said containers having a normally liquid rodent retardant therein which is capable of volatilization upon mixing of the ingredients of said containers, and a flexible shipping bag containing said first and second containers.

10. A method of encapsulating, in a gaseous state, a normally liquid rodent retardant in the cell structure of a rigid, foamed, cell-developed, thermosetting, material formed by mixing two normally liquid chemical ingredients which react exothermally to provide a thermoset material, comprising:

adding to one of said chemical ingredients used in the preparation of said foamed material a normally liquid rodent retardant which is miscible therewith, and which is capable of volatilization at the exothermic reaction temperature achieved by mixing said two normally liquid ingredients;

adding said one ingredient containing said rodent retardant to the other of said ingredients;

whereby said exothermic reaction forms said rigid, foamed, cell-developed, thermosetting material, and said retardant volatilizes and is trapped in said cells of material for release upon subsequent cell rupture.

11. A method of claim 10 wherein normally liquid rodent retardant is soluble in one of the reaction starting materials.

* * * * *